United States Patent
Vertemara et al.

(10) Patent No.: US 7,079,350 B1
(45) Date of Patent: Jul. 18, 2006

(54) CIRCUIT AND METHOD FOR CONTROLLING THE PARKING AND UNPARKING OF A READ-WRITE HEAD

(75) Inventors: Carlo Vertemara, San Jose, CA (US); Paolo Menegoli, San Jose, CA (US); Giorgio Pedrazzini, Laguna Niguel, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/451,746

(22) Filed: Nov. 30, 1999

(51) Int. Cl.
*G11B 5/596* (2006.01)

(52) U.S. Cl. .................................................. 360/78.06
(58) Field of Classification Search .................. 360/75, 360/78.04; 318/798, 806; 388/928.1
See application file for complete search history.

(56) References Cited

U.S. PATENT DOCUMENTS

| | | | | |
|---|---|---|---|---|
| 5,495,156 A | * | 2/1996 | Wilson et al. | 318/368 |
| 5,615,064 A | * | 3/1997 | Blank et al. | 360/75 |
| 5,781,363 A | * | 7/1998 | Rowan et al. | 360/78.09 |
| 5,982,130 A | * | 11/1999 | Male | 318/615 |
| 6,034,496 A | * | 3/2000 | Male | 318/439 |
| 6,040,671 A | * | 3/2000 | Brito et al. | 318/806 X |
| 6,081,112 A | * | 6/2000 | Carobolante et al. | 360/75 X |
| 6,154,340 A | * | 11/2000 | Cameron | 360/75 X |
| 6,204,629 B1 | * | 3/2001 | Rote et al. | 360/75 X |
| 6,229,663 B1 | * | 5/2001 | Yoneda et al. | 360/75 |
| 6,353,510 B1 | * | 3/2002 | Drouin | 360/75 |
| 6,631,045 B1 | * | 10/2003 | Pedrazzini | 360/75 |

* cited by examiner

*Primary Examiner*—K. Wong
(74) *Attorney, Agent, or Firm*—Lisa K. Jorgenson; Bryan A. Santarelli

(57) ABSTRACT

A control circuit controls a motor assembly having a coil and a movable arm. The control circuit includes a drive circuit that is coupled to the coil and that generates a drive signal in response to a control signal and a speed signal. The control circuit also includes a sensor circuit that is coupled to the drive circuit and to the coil and that generates the speed signal at a level that corresponds to the speed of the arm. In a disk drive, such a circuit can be used to control the movement of a read-write-head assembly during parking and unparking of a read-write head. The circuit monitors the speed of the head and uses this speed information as feedback to maintain the speed of the head within a specified range. This prevents damage to the head and other disk-drive components, particularly in a disk drive that incorporates a head parking platform.

42 Claims, 5 Drawing Sheets

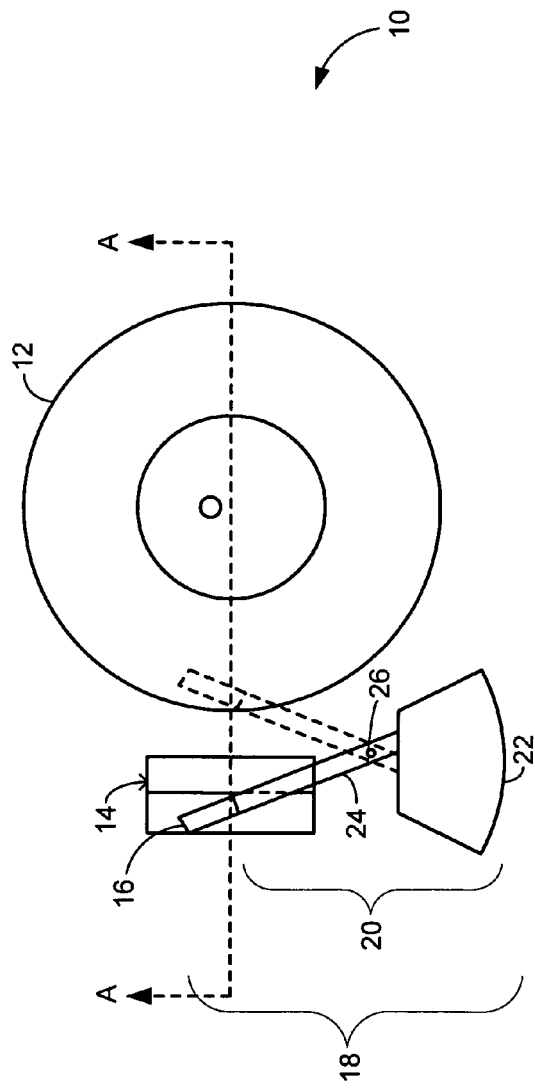
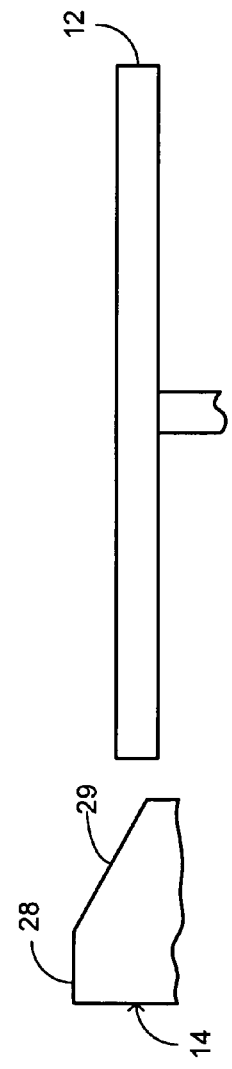
FIG. 1A (Prior Art)
FIG. 1B (Prior Art)

the parking surface 28. Typically, the ramped side wall 29 makes an angle of approximately 30°–60° with respect to the upper surface of the disk 12. For disk drives having a lower read-write head (not shown) in addition to the upper head 16, the platform 14 can be modified accordingly.
CIRCUIT AND METHOD FOR CONTROLLING THE PARKING AND UNPARKING OF A READ-WRITE HEAD

TECHNICAL FIELD OF THE INVENTION

The invention relates generally to electronic circuits, and more particularly to a circuit and method for controlling the parking and unparking of a read-write head in a disk drive.

BACKGROUND OF THE INVENTION

To prevent damage to the read-write head and to the magnetic storage disk when a disk drive is not in use, the disk drive "soft parks" or "hard parks" the head in a safe position with respect to the disk. Soft parking refers to parking the head when the disk drive will remain powered on after the park. For example, the disk drive typically soft parks the head during an extended period of non use such as a sleep or power-conservation mode. Conversely, hard parking refers to parking the head when the disk drive will be powered off after the park such as when one powers down a personal computer.

According to one technique for hard parking a read-write head, the disk drive moves and retains the head over the center or other portion of the disk where there is no stored data. Typically, a magnetic latch retains the head in the hard-park position until the disk is powered on. Thus, if the parked head contacts the disk, no data will be lost and the data-storage areas of the disk will be undamaged. Such contact may occur if one jostles the disk drive or the computer system incorporating the disk drive.

Unfortunately, this hard-parking technique is often unsuitable for laptop computers because they are often subjected to movements that are sufficient to jar the head loose from its parked position. As discussed below, an unrestrained head may be damaged, may corrupt stored data, or may damage the disk. Specifically, laptop computers, unlike desktop computers, are carried in many orientations and are jostled relatively frequently and forcefully. At times, this jostling may be sufficient to disengage the parked head from the magnetic retaining latch, particularly when the laptop is positioned such that gravity tends to pull the head out of the latch. Once disengaged from the latch, further jostling may cause the head to contact the data-storage areas of the disk. Such contact with the disk may corrupt stored data, permanently render the contacted area of the disk unable to store data, or damage the head or the arm to which the head is attached. But even if the jostling of the unparked head causes no data loss or damage, contact between the head and the data-storage areas of the disk as the disk starts to rotate upon power up may cause the data corruption or damage described above.

Referring to FIGS. 1A and 1B, a prior-art hard-parking/-unparking technique suitable for laptop computers is discussed.

FIG. 1A is a top plan view of a disk drive 10, which includes a disk 12 and parking platform 14 upon which the disk drive 10 hard parks an upper read-write head 16. Typically, the platform 14 is plastic and is positioned such that when one is carrying a laptop (not shown) in a normal carrying orientation, the platform 14 is between the ground and the disk 12 such that gravity tends to reinforce the parking of the head 16 on the platform 14. Therefore, the head 16 is less likely to fall off the platform 14 and contact the disk 12 if the laptop is jarred.

Still referring to FIG. 1A, the disk drive 10 also includes a read-write head assembly 18, which includes the head 16 and a motor assembly 20—sometimes called a voice coil motor—for moving the head 16 over the disk 12 during read and write cycles and for parking and unparking the head 16. The motor assembly 20 includes a stationary housing 22 containing one or more permanent magnets (not shown), a head-support arm 24 pivotally mounted to a post 26 and having a first end to which the head 16 is mounted and having a second end that extends into the housing 22, and an electronic coil (not shown in FIG. 1A) mounted to the second end of the arm 24. Alternatively, the coil is mounted to or within the housing 22 and the one or more permanent magnets are mounted to the second end of the arm 24.

FIG. 1B is a cut-away side view of the disk 12 and the platform 14 taken along lines AA of FIG. 1A. The platform 14 has an approximately level parking surface 28 and a ramped side wall 29, which extends from approximately the same level as the upper surface of the disk 12 to the parking surface 28. Typically, the ramped side wall 29 makes an angle of approximately 30°–60° with respect to the upper surface of the disk 12. For disk drives having a lower read-write head (not shown) in addition to the upper head 16, the platform 14 can be modified accordingly.

Referring to FIGS. 1A and 1B, the park and unpark procedures of the disk drive 10 are discussed. To hard park the read-write head 16, motor-assembly control circuitry (not shown in FIGS. 1A and 1B) drives a current through the coil (not shown in FIGS. 1A and 1B). The magnetic field generated by the energized coil interacts with the magnetic field generated by the one or more permanent magnets in the housing 22 such that the arm 24 pivots about the post 26 and moves the head 16 from a position over the disk 12 (dashed outline), up the ramped side wall 29, and onto the parking surface 28. Once the head 16 is parked on the surface 28, the laptop computer powers down the disk drive 10. To unpark the head 16, the laptop computer first powers up the disk drive 10. Once the disk 12 is rotating at its steady-state speed, the control circuitry energizes the coil such that the arm 24 pivots about the post 26 and moves the head 16 off of the parking surface 28, down the ramped side wall 29, and to a position over the disk 12. Although this technique may be suitable for soft parks and unparks in some applications, the disk drive 10 typically employs another technique for soft parking and unparking the head 16.

To prevent damage to and failure of the disk drive 10 during hard parking/unparking, the disk-drive manufacturer typically specifies the respective speed ranges—typically around 5 inches per second (IPS)—at which the read-write head 16 should be traveling during the above-described hard parking and unparking procedures. If the head 16 is traveling too fast during parking, then it may slam into the ramped side wall 29 at an excessive speed. This may damage the head 16, the motor assembly 20, or the platform 14. In addition, the speeding head 16 may scrape particles from the side wall 29, and these particles may contaminate and damage the disk 12. Likewise, if the head 16 is traveling too fast during unparking, it may bounce off of and thus damage the disk 12. Conversely, if the head 16 is traveling too slowly during parking, then it may have too little momentum to climb the ramped side wall 29 onto the parking surface 28. Likewise, if the head 16 is traveling too slowly during unparking, it may have too little momentum to leave the surface 28 and travel down the side wall 29.

Unfortunately, conventional motor-assembly control circuits (not shown in FIGS. 1A and 1B) are often unsuitable for implementing the hard-parking/-unparking technique described above in conjunction with FIGS. 1A and 1B. During normal read and write cycles, such a control circuit typically operates in a closed-loop configuration, relying on servo signals to indicate the position of the read-write head 16 relative to the disk 12. These servo signals are embedded in the data-storage areas of the disk 12, are read by the head 16, and are fed back to the control circuitry, which uses the fed-back servo signals to control the movement of the head 16. But during the last portion of the hard parking procedure and the initial portion of the hard unparking procedure, the head 16 is beyond the periphery of the disk 12 and thus cannot read the servo signals. Therefore, when the head 16 is beyond the disk periphery, the control circuit does not receive the servo signals and thus effectively operates in an open-loop configuration. Unfortunately, while operating in an open-loop configuration, the control circuit may cause the coil to move the head 16 at speeds that lie outside the respective ranges specified for the hard park and unpark speeds.

SUMMARY OF THE INVENTION

In one aspect of the invention, a control circuit is provided for controlling a motor assembly having a coil and a movable arm. The control circuit includes a drive circuit that can be coupled to the coil and that can generate a drive signal in response to a control signal and a speed signal. The control circuit also includes a sensor circuit that is coupled to the drive circuit, can be coupled to the coil, and that generates the speed signal at a level that corresponds to the speed of the arm.

Thus, in a disk drive, such a circuit can be used to control a read-write-head assembly during parking and unparking of a read-write head. The circuit monitors the speed of the head and uses this speed information as feedback to maintain the speed of the head within a specified range.

BRIEF DESCRIPTION OF THE DRAWINGS

FIG. 1A is a top plan view of a conventional disk drive having a read-write-head parking platform.

FIG. 1B is a cut-away side view of the disk drive taken along lines AA of FIG. 1A.

DESCRIPTION OF THE INVENTION

Figure 2:
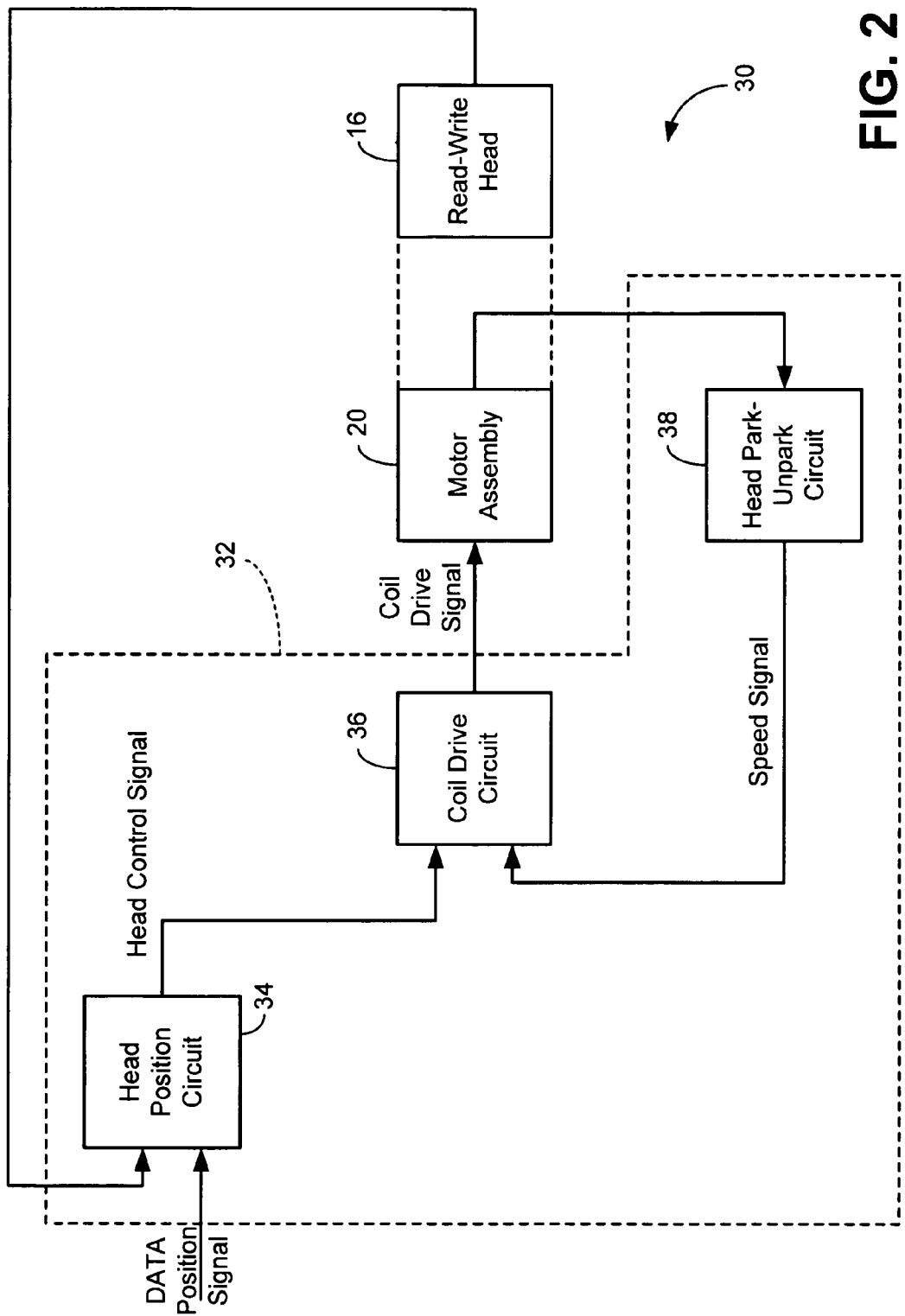
FIG. 2 is a block diagram of the motor assembly and read-write head of FIG. 1A and a control circuit for controlling the motor assembly according to an embodiment of the invention.

FIG. 2 is a block diagram of a read-write-head control circuit 30, which includes the read-write head 16 and the motor assembly 20 of FIG. 1A, and which a motor-assembly control circuit 32 according to an embodiment of the invention. The control circuit 32 drives the coil (FIG. 3), and thus controls movement of the head 16, during data read and write operations and also during the hard parking and unparking of the head 16 onto the platform 14 (FIGS. 1A and 1B). During the parking and unparking, the circuit 32 maintains the park/unpark speed of the head 16 within a predetermined range to prevent damage to the head 16 and to the other components of the disk drive.

The motor-assembly control circuit 32 includes a head-position circuit 34, a coil drive circuit 36, and a park-unpark circuit 38. The position circuit 34 generates a head control signal—with a digitized-to-analog converter (not shown) in one embodiment—during data read or write cycles and during both soft and hard park and unpark procedures. During a data read or write cycle, the circuit 34 generates the head control signal such that it causes the motor assembly 20 to position the head 16 over the sector of the disk 12 (FIGS. 1A and 1B) to be read from or written to. During a soft park or unpark procedure, the circuit 34 generates the head control signal such that it causes the motor assembly 20 to respectively move the head 16 to or from the soft-park position. And during a hard park or unpark procedure, the circuit 34 generates the head control signal such that it causes the motor assembly 20 to respectively move the head onto or off of the platform 14 (FIGS. 1A and 1B). The drive circuit 36 generates a coil drive signal in response to the head control signal from the circuit 34 during data read and write cycles and during soft park and unpark procedures. But during a hard park or unpark procedure, the drive circuit 36 generates the drive signal in response to both the head control signal and a speed signal that indicates the speed at which the head 16 is traveling. Thus, the speed signal causes the drive circuit 36 to maintain the hard-park/-unpark speed of the head 16 within a specified range. The park-unpark circuit 38 is inactive during data read and write cycles and soft park and unpark procedures, but monitors the speed of the head 16 during the hard park and unpark procedures and feeds back this information to the drive circuit 36 in the form of the speed signal.

Still referring to FIG. 2, in operation during a read or write cycle the motor-assembly circuit 32 controls the movement of the read-write head 16 between disk data sectors in a conventional manner. Specifically, the position circuit 34 receives a data-position signal, which identifies a sector of the disk 12 (FIGS. 1A and 1B) to be read from or written to. Via a servo feedback loop, the circuit 34 also receives the disk servo signals, which identify the position of the head 16 with respect to the disk 12. By comparing the actual position (servo signals) of the head 16 with its selected position (data-position signal), the circuit 34 generates the head control signal such that the head 16 moves to the desired position and remains there until a new data-position signal is received. As stated above, the drive circuit 36 converts the head control signal into a coil drive signal, and the park-unpark circuit is inactive or uncoupled from the drive circuit 36.

In operation during a soft park or unpark procedure, the motor-assembly control circuit 32 controls the movement of the read-write head 16 to and from the soft park position—the center of the disk 12 for example—in a conventional manner.

In operation during a hard park or unpark procedure, the motor-assembly control circuit 32 causes the read-write head 16 to attain a speed that is within a specified range and that remains within the specified range approximately until the head 16 is respectively parked or unparked. Specifically, the data-position signal indicates that the circuit 32 is to hard park or unpark the head 16. In response to the data-position signal, the position circuit 34 generates the head control signal such that the head 16 accelerates in the proper direction and to the specified speed. For example, during a hard park procedure, the head control signal causes the head 16 to accelerate toward the parking platform 14 (FIGS. 1A and 1B). Conversely, during a hard unpark procedure, the head control signal causes the head 16 to accelerate from the platform 14 toward the disk 12. Because the head 16 will not be over the disk 12 for a significant portion of both the park and unpark procedures, the position circuit 34 ignores the servo signals during these procedures. Furthermore, the control circuit 32 uses negative feedback to prevent the drive circuit 36 from accelerating the head 16 beyond the specified speed range. Specifically, the park-unpark circuit 38 monitors the speed of the head 16 via the motor-assembly coil (FIG. 3) and feeds back the speed signal to the drive circuit 36. The speed signal causes the drive circuit 36 to generate the drive signal such that once the head 16 attains a speed within the desired range, the head speed remains within this range until the head 16 is respectively hard parked or unparked. For example, during a hard park procedure, the circuit 38 causes the drive circuit 36 to maintain the head speed within the specified range approximately until the head 16 is on the parking surface 28 of the parking platform 14 (FIG. 1B). Similarly, during an unpark procedure, the circuit 38 causes the drive circuit 36 to maintain the head speed within the specified range approximately until the head 16 is over the disk 12.

To end the hard park and unpark procedures, the attainment of the final park and unpark positions may be determined by monitoring the current through or the voltage across the motor-assembly coil or by other means, the operation of the park-unpark circuit 38 may be timed, or a combination of monitoring and timing may be used. For example, a high or rapidly rising coil current can indicate that the head 16 is stationary, and thus has reached its parked position on the platform 14 (FIGS. 1A and 1B). Conversely, a low or rapidly falling current can indicate that the head 16 is moving from its parked position. On the other hand, if the operation of the circuit 38 is timed, then the disk-drive manufacturer may empirically determine and program the circuit 32 with park and unpark times during the testing of the disk drive.

Figure 3:
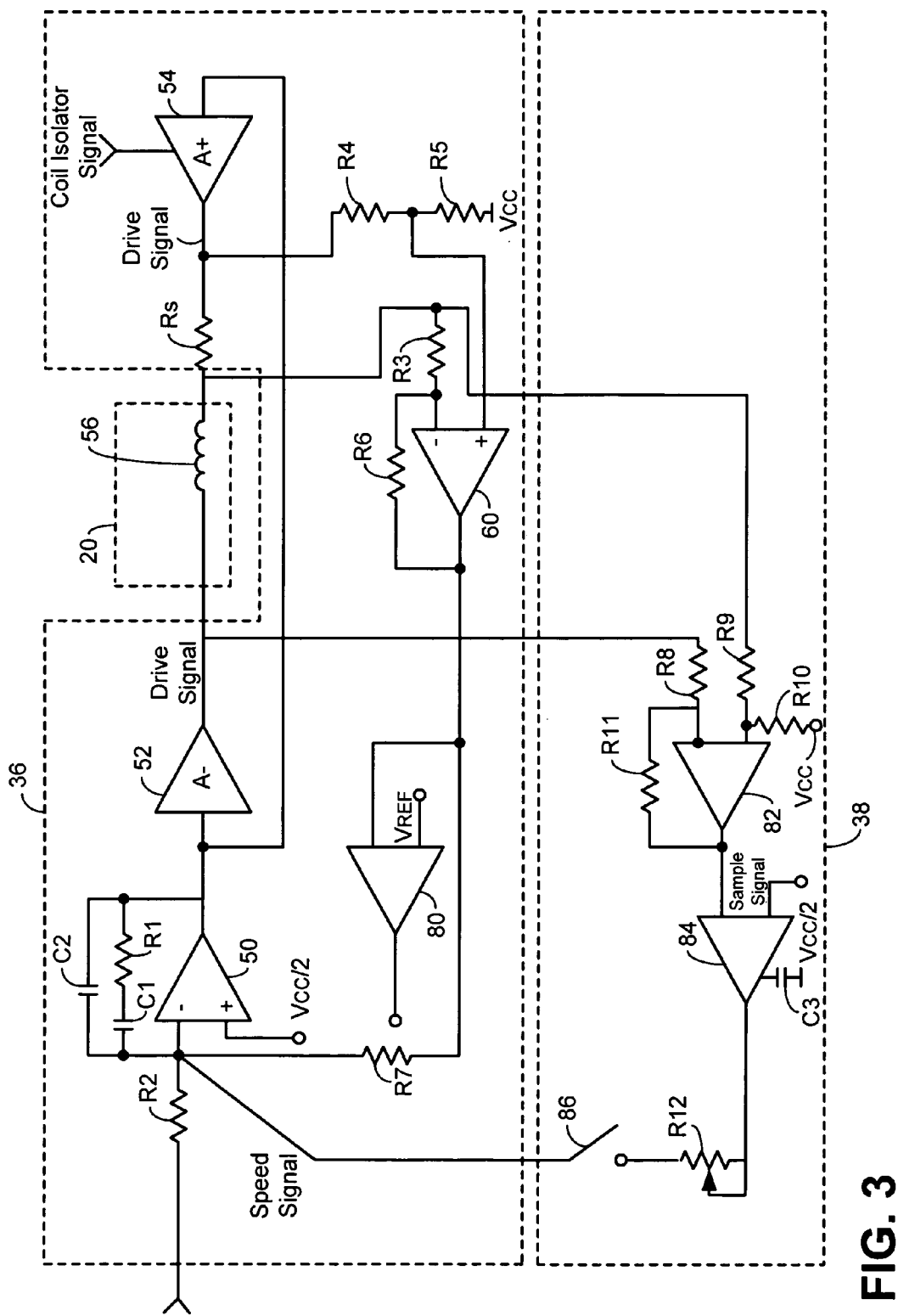
FIG. 3 is a schematic diagram of the drive and park-unpark circuits of FIG. 2 according to an embodiment of the invention.

FIG. 3 is a schematic diagram of the coil drive circuit 36 and the head park-unpark circuit 38 of FIG. 2 according to an embodiment of the invention.

The circuit 36 includes an integrator 50 having inverting (−) and noninverting (+) input terminals and negative-feedback components C1, C2, and R1. The inverting terminal receives the head control signal from the position circuit 34 (FIG. 2) via an input resistor R2, and the noninverting terminal receives a bias voltage that equals Vcc/2 in this embodiment. Tristatable buffers 52 and 54, which are also biased to Vcc/2, receive the output signal from the integrator 50 and generate a drive signal for differentially driving a coil 56 of the motor assembly 20. Although a single coil 56 is shown, the motor assembly 20 may have multiple coils 56 that are driven by multiple pairs of buffers 52 and 54. A series sense resistor Rs converts the current through the coil 56 into a sense voltage. A feedback amplifier circuit 60 includes inverting and noninverting input terminals, an input resistor R3, input/bias resistors R4 and R5, and a negative-feedback resistor R6. The amplifier circuit 60 has its noninverting terminal biased to Vcc/2 and differentially amplifies the sense voltage and feeds the amplified sense voltage back to the inverting terminal of the integrator 50 via an input resistor R7. In one embodiment, the product of the gain of the amplifier circuit 60 and the value of the sense resistor Rs is unity. In one example of such an embodiment, the components of the circuit 36 have the following values: C1=1000 picofarad (pf), C2=100 p, R1=62 kiloohms (kΩ), Rs=0.25 Ω, R3=30 kΩ, R4=R5=R7=10 Ω, R=70 kΩ, and the buffers 52 and 56 each have unity gain.

The circuit 36 may also include an optional comparator 80, which compares the current through the coil 56 to a reference value to determine if the head is parked during a hard-park procedure or unparked during a hard-unpark procedure. Specifically, the circuit 36 compares the amplified sense voltage from the amplifier 60 to a reference voltage Vref during a hard-parking or -unparking procedure.

Still referring to FIG. 3, the park-unpark circuit 38 includes an amplifier circuit 82 for differentially sensing and amplifying the coil 56 back voltage—often called the back electromotive force (BEMF)—which is proportional to the speed at which the head 16 (FIG. 1A) is traveling. The amplifier circuit 82 has a noninverting input terminal biased to Vcc/2 and includes an input resistor R8, input/bias resistors R9 and R10, and a negative-feedback resistor R11. Because the coil 56 typically has some internal resistance, current flowing through the coil generates a voltage that is superimposed upon the back voltage. Therefore, to obtain an accurate reading of the back voltage, the circuit 38 also includes a sample-and-hold circuit 84 for sampling the amplified back voltage from the amplifier circuit 82 during periods when approximately zero current flows through the coil 56. The sample-and-hold circuit 84 includes a holding capacitor C3, which is biased to Vcc/2, and couples the sampled back voltage, i.e., the speed signal, to the inverting terminal of the integrator 50 via an input resistor R12, which may be variable. Because the speed signal is only needed during a hard park or unpark of the head 16, a switch 86 is closed during hard-park and -unpark procedures and is opened at all other times to uncouple the park-unpark circuit 38 from the input of the drive circuit 36. In one embodiment, the components of the circuit 38 have the following values: C3=0.015 microfarads (μf), R8=R9=R10=R11=10 kΩ, and R12 is a 3 kΩ potentiometer.

In conventional operation during a read or write cycle, the head control signal has a control-signal voltage that causes the drive circuit 36 to drive a current through the coil 56, and this current causes the head 16 (FIG. 1A) to move from its current position over the disk 12 (FIGS. 1A and 1B) to the data sector to be read from or written to. The position circuit 32 (FIG. 2) may conventionally generate the head control signal in either a pulse-width-modulation (PWM) or linear mode. In one embodiment, Vcc=12 volts (V), and the control-signal voltage has a value between 5V and 7V, which is ±1V swing about the integrator 50 bias voltage Vcc/2=6V. In response to the control signal, the integrator 50 generates a voltage ramp at its output. The slope of the voltage ramp has a magnitude that is proportional to the magnitude of the control-signal voltage, a negative slope if the control-signal voltage is greater than the bias voltage Vcc/2, and a positive slope if the control-signal voltage is less than Vcc/2. The buffers 52 and 54 differentially drive the coil 56 with the voltage ramp. For example, if the voltage ramp is currently at 8V—this is 2V above the buffer bias voltage Vcc/2=6V—then the buffer 52 generates −2V on one side of the coil 56 and the buffer 54 generates +2V on the other side such that the series combination of the coil 56 and Rs has 4V across it. Thus, if Rs=0.25 Ω, then there is 1 ampere (A) of current flowing the coil 56.

As the current through the coil 56 increases, so does the sense voltage across Rs, and thus the voltage that the amplifier circuit 60 feeds back to the inverting terminal of the integrator 50 also increases. Because this feedback voltage is negative with respect to the control-signal voltage, it tends to reduce the current into the summing node of the integrator 50, and thus tends to reduce the slope of the voltage ramp, i.e., the rate at which the voltage ramp increases. Thus, the amplifier circuit 60 provides negative feedback that stabilizes the drive circuit 36. How quickly the magnitude of the feedback voltage approaches the magnitude of the control-signal voltage depends on the transfer function of the loop formed by the integrator 50, the buffers 52 and 54, the coil 56, Rs, and the amplifier circuit 60.

The position circuit 34 (FIG. 2) continually monitors the servo signals from the disk 12. As the servo signals indicate that the head 16 is getting closer to the desired data sector, the circuit 34 reduces the control-signal voltage until it eventually equals the bias voltage Vcc/2. As the magnitude of the control-signal voltage decreases, the feedback voltage from the amplifier circuit 62 causes the integrator 50 output voltage to ramp back toward the control-signal voltage. Once the integrator 50 output voltage settles to Vcc/2, the differential voltage across, and thus the current through, the coil 56 and Rs is zero, and the head 16 is over the desired data sector of the disk 12.

Figure 4:
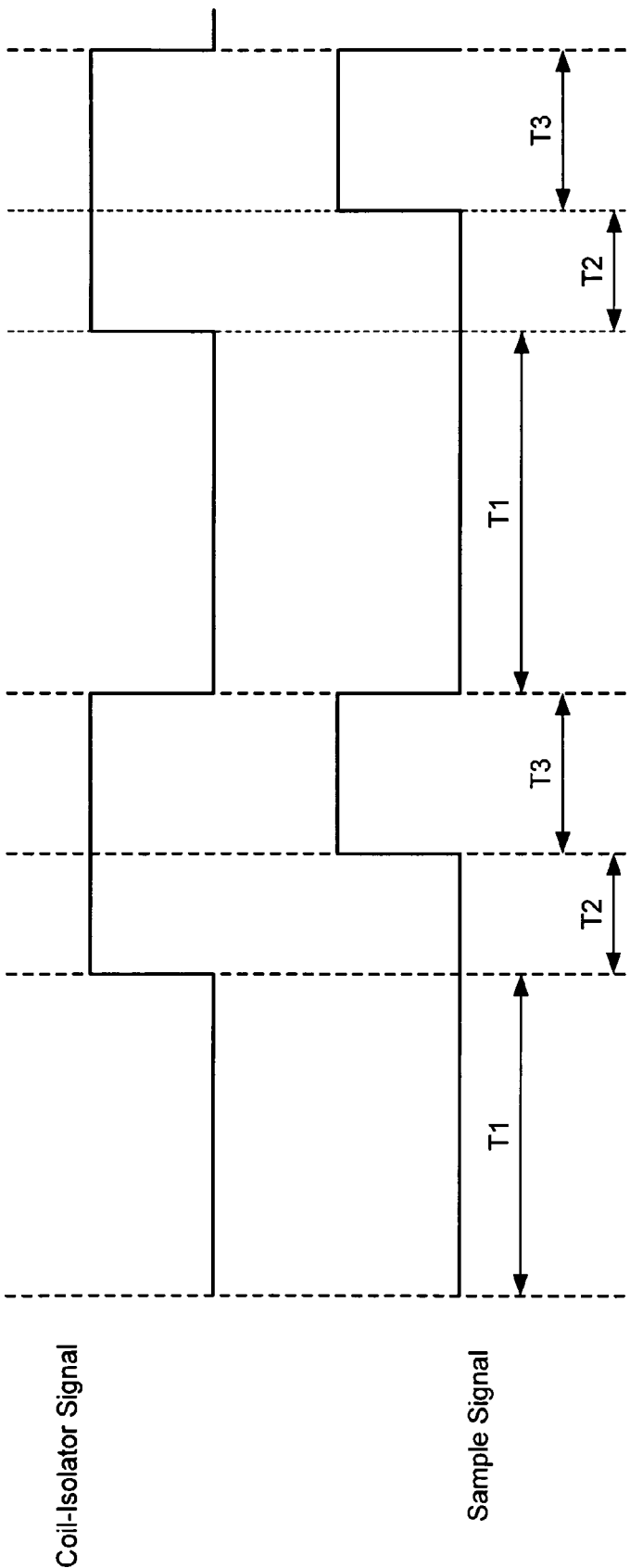
FIG. 4 is a timing diagram of the coil-isolation, and sample signals of FIG. 3 according to an embodiment of the invention.

FIG. 4 is a timing diagram of the coil-isolation and sample signals of FIG. 3 during a hard park or unpark of the head 16 (FIG. 1A).

Referring to FIGS. 3 and 4, the operation of the drive circuit 36 and park-unpark circuit 38 during a hard park and unpark procedure is discussed. As described above for a data read or write cycle, the position circuit 32 (FIG. 2) generates the head control signal having a control-signal voltage to move the head 16 (FIG. 1A) toward the hard-park or -unpark position, and the amplifier circuit 60 provides negative feedback to stabilize the drive circuit 36. The control-signal voltage may be empirically determined by the manufacturer to provide an appropriate acceleration to the head 16 for hard parking and unparking. Alternatively, for hard parking, the control-signal voltage may vary depending upon the initial pre-park position of the head 16. Because the head 16 cannot read the servo signals while it is not over the disk 12, the position circuit 32 (FIG. 2) cannot use the servo signals to gradually reduce the control-signal voltage as the head 16 approaches the hard-park or -unpark positions. Thus, the park-unpark circuit 38 effectively provides the feedback that the servo signals cannot such that the drive circuit 36 does not accelerate the head 16 to speeds that are outside of the specified range for hard parking and unparking, and thus does not cause damage to the head 16 or other disk-drive components.

Referring to FIG. 4, the head-park and -unpark procedures are each subdivided into a repeating series of time periods T1, T2, and T3. During T1, a sample/isolation circuit (not shown) generates the coil-isolation signals at a buffer-enable level—here logic 0—to allow the drive circuit 36 to drive the coil 56 and thus accelerate the head 16 toward the hard-park or -unpark position.

During T2, the sample/isolation circuit transitions the coil-isolation signals to a buffer-disable level—here logic 1—to electrically isolate the coil 56 from the integrator 50 so that the coil current can decay to approximately 0 A. As discussed above in conjunction with FIG. 3, by allowing the current through the coil 56 to decay to approximately 0 A, the circuit 38 can monitor the coil back voltage, which is proportional to the speed of the head 16. In one embodiment, the duration of T2 is empirically determined by the disk-drive manufacturer as sufficient to allow the coil current to decay to approximately 0 A. Alternatively, the sample/isolation circuit can monitor the output of the comparator 80 to determine when the coil current has decayed to approximately 0 A. For example, the manufacturer may choose the value of Vref such that the comparator 80 changes states when the coil current falls below a predetermined value such as 100 milliamps (mA). In response to the comparator 80 changing states, the sample/isolation circuit can extend T2 for a predetermined time that is sufficient to allow the coil current to decay to 0 A. This predetermined time may be empirically determined and programmed into the sample/isolation circuit by the disk-drive manufacturer. Because of errors that can be introduced by the offset voltages of the amplifier circuit 60 and the comparator 80, this technique is often preferred over setting Vref=0V such that the comparator 80 changes states when the coil current decays to approximately 0 A.

During T3, the current through the coil 56 is approximately 0 A such that the only voltage component across the coil 56 is the back voltage, which is proportional to the speed of the arm 24 through the motor housing 22 (FIG. 1A), and thus which is proportional to the speed of the read-write head 16. The sample/isolation circuit (not shown) transitions the sample signal to a sample level—here logic 1—which causes the sample-and-hold circuit 84 to sample the amplified back voltage from the amplifier 82. The circuit 84 feeds back the sampled back voltage to the integrator 50 to adjust the magnitude of the ramp voltage, and thus the coil drive signal, in much the same way that the feedback voltage from the amplifier circuit 60 adjusts the magnitude of the ramp voltage as described above in conjunction with FIG. 3.

Still referring to FIGS. 3 and 4, the sequence of events occurring during T1, T2, and T3 is repeated one or more times to maintain the head 16 within the specified speed range until it is hard parked or unparked. That is, by monitoring the back voltage across the coil 56 and adjusting the drive signal to maintain the back voltage at a relatively constant level, the park-unpark circuit 38 causes the drive circuit 36 to drive the coil 56 such that the head 16 moves at a relatively constant speed during hard parking and unparking. One can set the head speed according to conventional circuit principles by adjusting a number of variables including the level of the control-signal voltage from the head position circuit 34 (FIG. 2), the gain of the amplifier circuit 82, and the setting of the optional potentiometer R12.

The sample/isolation circuit halts the hard-park/-unpark sequence when the head 16 is hard parked or unparked. The sample/isolation circuit does this by opening the switch 86 and signaling the head position circuit 34 (FIG. 2) either to transition the control-signal voltage to a value that will cause the current through the coil 56 to settle to 0 A (hard park) or to continue normal read or write operations (hard unpark). In one embodiment, the manufacturer programs the sample/isolation circuit such that the series of T1-T2-T3 sequences lasts for a predetermined time that the manufacturer has empirically determined to be sufficient to hard park and unpark the head 16. This time may be the same or different for the hard park and unpark procedures. Alternatively, the sample/isolation circuit can monitor the current through the coil 56 via the comparator 80 to determine the end of the park/unpark sequence. Specifically, during the parking procedure, once the head 16 comes to rest on the parking surface 28 (FIG. 1B), the current through the coil 56 increases rapidly because there is no back voltage to oppose it. Thus, the voltage across Rs and the circuit 60 output voltage, which are proportional to the coil current, also increases rapidly. Therefore, Vref can be set such that when the coil current exceeds a predetermined value, the output of the comparator 80 changes states to indicate that the head 16 is parked. Similarly, during the unparking procedure, the coil current rises rapidly until the head 16 begins moving off of the parking surface 28 (FIG. 1B). Once the head 16 begins to move, the coil current levels off and decreases because the movement-induced back voltage opposes it. Therefore, Vref can be set such when the coil current falls back below a predetermined value after an initial rapid rise, the output of the comparator 80 changes states to indicate that the head 16 is unparked.

Still referring to FIGS. 3 and 4, in one embodiment, the sample/isolation circuit (not shown), which generates the sample and coil-isolation signals as described above, is programmed such that T1≈500 microseconds (μs), T2≈300 μs, and T3≈50 μs such that the sum of these periods provides a hard-park/-unpark cycle of approximately 1 millisecond (ms). In another embodiment, the sample/isolation signal includes a register having a bit whose value controls the state of the switch 86. In yet another embodiment, the sample/isolation signal is similar to one or more of the circuits discussed in U.S. patent application Ser. No. 09/135,471, filed Aug. 17, 1998, and assigned to the same assignee as the present application.

Figure 5:
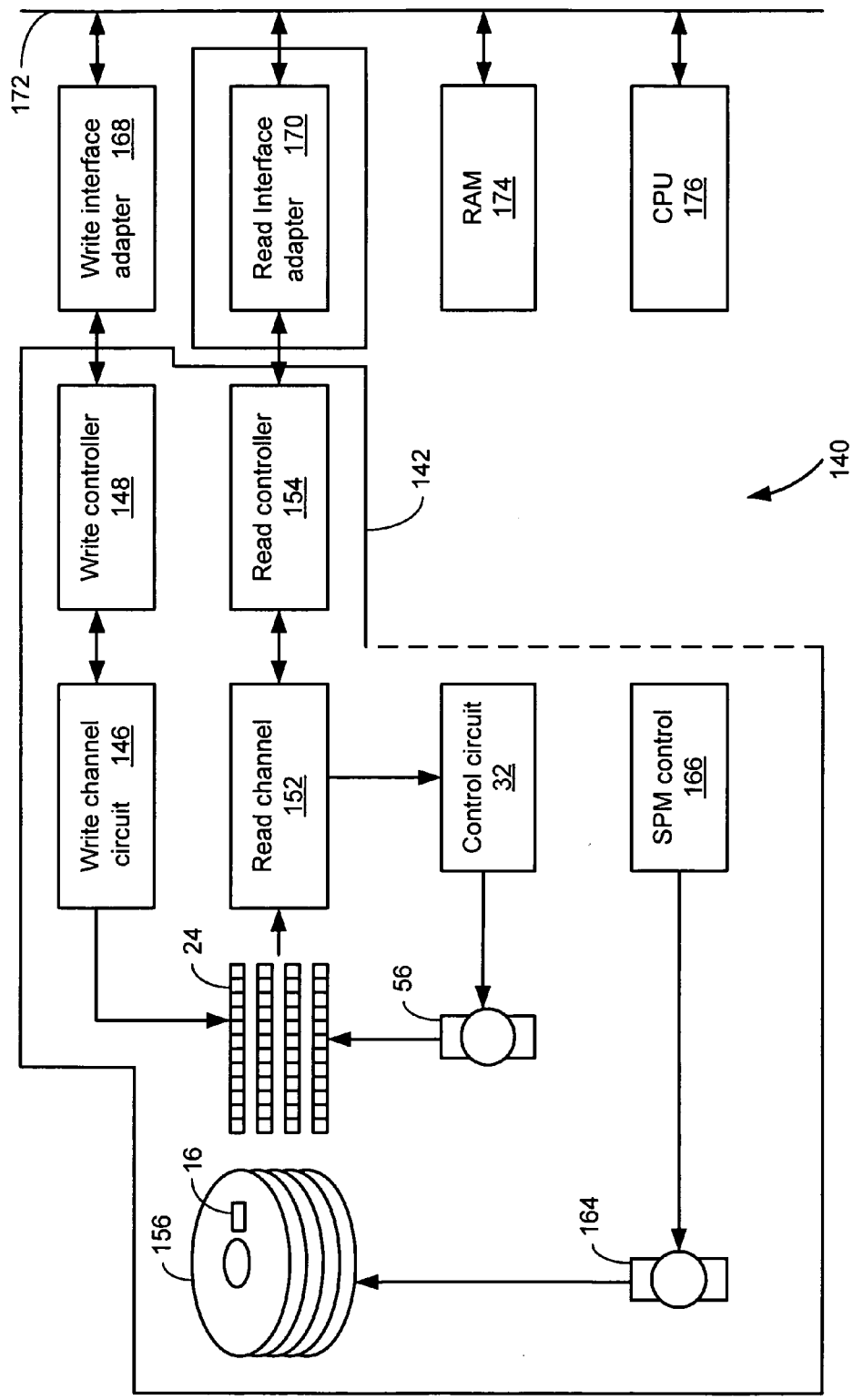
FIG. 5 is a block diagram of a disk-drive system that incorporates the disk drive of FIG. 1A and the control circuit of FIG. 2 according to an embodiment of the invention.

FIG. 5 is a block diagram of a disk-drive system 140 according to an embodiment of the invention. Specifically, the disk-drive system 140 includes a disk drive 142, which incorporates the control circuit 32 of FIG. 2. The disk drive 142 includes the read-write head 16, a write-channel 146 for generating and driving the head 16 with a write signal, and a write controller 148 for interfacing the write data to the write-channel circuit 146. The disk drive 142 also includes a read-channel circuit 152 for receiving a read signal from the head 16 and for recovering the written data from the read signal, and includes a read controller 144 for organizing the read data. The disk drive 142 further includes one or more disks 156, each of which may contain data on one or both sides. In one embodiment, the disks 156 are each similar to the disk 12 of FIGS. 1A and 1B. The read-write head 16 writes/reads the data stored on the disks 156 and is connected to the support arm 24. The control circuit 32 drives the coil 56, which positionally maintains/moves the arm 24 so as to positionally maintain/radially move the head 16 over the desired data on the disks 156 as discussed above in conjunction with FIGS. 2 and 3. A spindle motor (SPM) 164 and a SPM control circuit 166 respectively rotate the disks 156 and maintain them at the proper rotational speed.

The disk-drive system 140 also includes write and read interface adapters 168 and 170 for respectively interfacing the write and read controllers 148 and 154 to a system bus 172, which is typically specific to the system used. Typical system busses include ISA, PCI, S-Bus, Nu-Bus, etc. The system 140 also typically has other devices, such as a random access memory (RAM) 174 and a central processing unit (CPU) 176 coupled to the bus 172.

From the foregoing it will be appreciated that, although specific embodiments of the invention have been described herein for purposes of illustration, various modifications may be made without deviating from the spirit and scope of the invention.

What is claimed is:

1. A control circuit for controlling a motor assembly having a coil with first and second nodes and having a movable arm, the control circuit comprising:
   a drive circuit operable to be coupled to the first and second nodes of the coil, to receive a control signal, a current signal indicating a magnitude of a current flowing through the coil, and a speed signal, to generate a drive signal in response to the control, current, and speed signals to drive the coil with the drive signal during drive periods, and to uncouple the drive signal from the coil during measurement periods that alternate with and are separate from the drive periods, and wherein the drive circuit generates the drive signal responsive to the speed signal only during hard-parking and hard-unparking of the movable arm; and
   a sensor circuit coupled to the drive circuit and having first and second sensor nodes operable to be respectively coupled to the first and second nodes of the coil such that no element is in series with the coil between the first and second sensor nodes, the sensor circuit operable to generate the speed signal having a level that corresponds to the speed of the arm.

2. The control circuit of claim 1 wherein the sensor circuit is operable to generate the speed signal by sensing a back voltage across the coil during a portion of each measurement period when the current signal indicates that substantially zero current is flowing through the coil and by generating the level of the speed signal such that the level corresponds to the sensed back voltage.

3. The control circuit of claim 1 wherein the drive circuit is operable to accelerate the arm to a predetermined speed and to maintain the arm at approximately the predetermined speed for a predetermined time period.

4. A control circuit for controlling a read-write head assembly only during a park or unpark operation, the head assembly including a motor assembly having a coil and a movable arm, the head assembly also including a read-write head coupled to the arm, the control circuit comprising:
   a drive circuit operable to receive a control signal, a current signal indicating a magnitude of a current flowing through the coil, and a speed signal, to generate a drive signal in response to the control, current, and speed signals, to drive the coil in response to the control and speed signals during drive periods, and to uncouple the drive signal from the coil during measurement periods that alternate with and are separate from the drive periods such that the read-write head moves to or from a ramped parking platform at a speed that is approximately five inches per second for a predetermined time period; and
   a sensor circuit coupled to the drive circuit and operable to sense the speed of the read-write head during the measurement periods and to generate the speed signal having a level that corresponds to the sensed speed of the read-write head.

5. The control circuit of claim 4 wherein the drive circuit is operable to generate the drive signal in response to the sum of the control, current, and speed signals.

6. The control circuit of claim 4 wherein the sensor circuit is operable to sense the speed of the read-write head by sensing a back voltage across the coil during a portion of each measurement period when the magnitude of the current signal indicates that approximately zero current is flowing through the coil.

7. The control circuit of claim 4 wherein the sensor circuit is operable to:
   sense the speed of the read-write head by sensing a back voltage across the coil; and
   generate the speed signal by generating an intermediate signal from the sensed back voltage, sampling the intermediate signal during a portion of each measurement period when the current signal indicates that substantially zero current is flowing through the coil, and generating the level of the speed signal such that the level corresponds to the sampled intermediate signal.

8. A control circuit for controlling a read-write head assembly that includes a motor assembly having a post, an arm having first and second ends and a midsection pivotally mounted to the post, and a coil operable to move the first end of the arm, the read-write head assembly also including a read-write head coupled to the second end of the arm, the control circuit comprising:
 a drive circuit having a control input terminal, a feedback input terminal adapted to receive a current signal indicating a magnitude of a current flowing through the coil, and a first output terminal that is operable to be coupled to a first terminal of the coil; and
 a speed-sense circuit having first and second input terminals that are operable to be directly coupled to the first terminal and a second terminal of the coil such that no element is in series with the coil between the first and second input terminals, the speed-sense circuit also having an output terminal coupled to the feedback input terminal of the drive circuit, the speed-sense circuit operable to sense a speed of the arm during measurement periods only during hard-park and hard-unpark operations of the arm when substantially zero current flows through the coil.

9. The control circuit of claim 8 wherein the control and feedback input terminals are coupled together.

10. The control circuit of claim 8, further comprising a switching circuit coupled between the feedback input terminal and the output terminal of the of the speed-sense circuit, the switching circuit being operable to couple the feedback input to the output terminal responsive to a control signal being active and to isolate the feedback input from the output terminal responsive to the control signal being inactive.

11. The control circuit of claim 8 wherein the drive circuit comprises a second output terminal operable to be coupled to a second terminal of the coil.

12. A disk-drive system, comprising:
 a disk having a peripheral edge and a surface;
 a platform disposed adjacent to the peripheral edge of the disk and raised with respect to the disk surface;
 a coil;
 an arm;
 a read-write head coupled to the arm; and
 a nondithering control circuit coupled to the coil and adapted to receive a current signal indicating a magnitude of a current flowing through the coil, the nondithering control circuit operable to cause the coil to park the read-write head by sensing a speed of the arm during measurement periods when the current signal indicates substantially zero current flows through the coil and, in response to the sensed speed, moving the read-write head from over the disk onto the platform at approximately a constant speed.

13. The disk-drive system of claim 12 wherein the platform has a ramped side that faces the disk.

14. The disk-drive system of claim 12 wherein the constant speed equals approximately five inches per second.

15. The disk-drive system of claim 12, further comprising:
 a post;
 the arm having a first end magnetically coupled to the coil, having a second end, and having a midsection pivotally mounted to the post; and
 the read-write head coupled to the second end of the arm.

16. The disk-drive system of claim 12, further comprising:
 a post;
 the arm having first and second ends and having a midsection pivotally mounted to the post;
 the coil mounted to the first end of the arm; and
 the read-write head coupled to the second end of the arm.

17. A method, comprising:
 during hard-park and hard-unpark operations of a read-write head,
  accelerating the read-write head to approximately a predetermined speed using a head-motor coil;
  sensing a current flowing through the coil;
  directly monitoring a back voltage across two nodes of the coil such that no circuit element is in series with the coil between the two nodes during measurement periods when substantially zero current flows through the coil; and
  when or after the head attains the predetermined speed, maintaining the speed of the head at approximately the predetermined speed in response to the back voltage.

18. The method of claim 17 wherein the accelerating comprises accelerating the read-write head from a position over a disk toward a parking platform.

19. The method of claim 17 wherein the accelerating comprises accelerating the read-write head from a position on a parking platform toward a disk.

20. The method of claim 17 wherein the maintaining comprises periodically monitoring the speed of the read-write head.

21. The method of claim 17 wherein the maintaining comprises maintaining the speed of the head at approximately the predetermined speed approximately until the head is on a parking surface of a parking platform.

22. The method of claim 17 wherein the maintaining comprises maintaining the speed of the head approximately at or below the predetermined speed until the head moves to a position over a disk from a parking surface of a parking platform.

23. The method of claim 17 wherein the maintaining comprises periodically updating a drive signal to the head-motor coil.

24. A method, comprising:
 coupling a nondithered drive signal to a coil of a motor assembly to park a read-write head on a ramped platform;
 sensing a current flowing through the coil;
 uncoupling the drive signal from the coil to allow the current flowing through the coil to decay to approximately zero;
 during hard-park and hard-unpark operations of the read-write head when the sensed current is approximately zero, sampling a back voltage across the coil;
 adjusting the drive signal in response to the sampled back voltage;
 coupling the adjusted drive signal to the coil, the adjusted drive signal shifting the back voltage toward or maintaining the back voltage substantially at a predetermined level; and
 repeating the sensing, uncoupling, sampling, adjusting, and coupling the adjusted drive signal one or more times.

25. The method of claim 24 wherein the sampling comprises:
 determining when the current through the coil approximately equals or is less than a predetermined value; and waiting a predetermined time after the step of determining before sampling the back voltage.

26. The method of claim 24 wherein:
the sampling comprises,
generating an intermediate signal that corresponds to the back voltage,
sampling the intermediate signal while the approximately zero current is flowing through the coil, and
the adjusting comprises,
generating a sum of the sampled intermediate signal and a control signal, and
generating the drive signal corresponding to the sum.

27. A disk-drive system, comprising:
a disk having a peripheral edge and a surface;
a platform disposed adjacent to the peripheral edge of the disk and raised with respect to the disk surface;
a coil;
an arm;
a read-write head coupled to the arm; and
a nondithering control circuit coupled to the coil and adapted to receive a current signal indicating a magnitude of a current flowing through the coil, the nondithering control circuit operable to cause the coil to unpark the read-write head by sensing a speed of the arm during measurement periods when the current signal indicates substantially zero current flows through the coil and, in response to the sensed speed, moving the read-write head from the platform to a position over the disk at approximately a constant speed.

28. A method, comprising:
coupling a nondithered drive signal to a coil of a motor assembly to park a read-write head on a platform;
sensing a current flowing through the coil;
uncoupling the drive signal from the coil to allow the current flowing through the coil to decay to approximately zero;
sampling a back voltage across the coil while the approximately zero current is flowing through the coil;
adjusting the drive signal in response to the sampled back voltage;
coupling the adjusted drive signal to the coil, the adjusted drive signal shifting the back voltage toward or maintaining the back voltage substantially at a predetermined level; and
repeating the sensing, uncoupling, sampling, adjusting, and coupling the adjusted drive signal one or more times only during hard-park and hard-unpark operations of the read-write head.

29. The control circuit of claim 1 wherein the drive signal is nondithered.

30. The control circuit of claim 1 wherein the drive signal is operable to move a portion of the moveable arm at a speed of approximately five inches per second.

31. The control circuit of claim 8 wherein the drive circuit is operable to drive the coil with a linear signal.

32. The control circuit of claim 8 wherein the drive circuit is operable to cause the read/write head to move at a speed of approximately five inches per second.

33. The method of claim 17 wherein the predetermined speed is approximately five inches per second.

34. The method of claim 28 wherein the adjusted drive signal shifts the back voltage toward or maintains the back voltage substantially at a predetermined level that corresponds to the read-write head moving toward the ramp at approximately five inches per second.

35. The control circuit of claim 1 wherein the sensor circuit is further operable to apply the speed signal to the drive circuit during a hard park mode of operation and to isolate the speed signal from the sensor circuit during a normal mode of operation.

36. The control circuit of claim 35 wherein the normal mode of operation includes read, write, and soft-park modes of operation.

37. The control circuit of claim 1 wherein the drive circuit is operable to generate the drive signal in response to the sum of the control, current, and speed signals.

38. A control circuit for controlling a motor assembly having a coil with first and second nodes and having a movable arm, the control circuit comprising:
a drive circuit adapted to be coupled to the first and second nodes of the coil and adapted to receive a control signal, a current signal indicating a magnitude of a current flowing through the coil, and a speed signal, the drive circuit being operable in a drive mode to generate a drive signal in response to the control, current, and speed signals only during a hard-park submode of operation and to generate the drive signal in response to the control and current signals during a normal submode of operation, and the drive circuit being operable to apply the drive signal to drive the coil during the drive mode and being operable during a measurement mode to isolate the drive signal from the coil; and
a speed sensor circuit coupled to the drive circuit and having first and second sensor nodes adapted to be respectively coupled to the first and second nodes of the coil, the speed sensor circuit operable to generate the speed signal indicating a speed of the arm.

39. The control circuit of claim 38 wherein the sensor circuit is further operable to apply the speed signal to the drive circuit during the hard-park submode of operation and to isolate the speed signal from the drive circuit during the normal submode of operation.

40. The control circuit of claim 39 wherein the normal mode of operation includes read, write, and soft-park modes of operation.

41. The control circuit of claim 40 wherein the drive circuit is operable to generate the drive signal in response to a sum of the control, current, and speed signals.

42. The control circuit of claim 41 wherein the speed sensor circuit is operable to sample a back voltage across the coil responsive to the current signal indicating a predetermined current is flowing through the coil during the measurement mode of operation, and wherein the speed sensor circuit is further operable to generate the speed signal having a value that is function of the sampled back voltage.

* * * * *